United States Patent [19]

Nitschke

[11] Patent Number: 4,496,885
[45] Date of Patent: Jan. 29, 1985

[54] POSITIONING CONTROL SYSTEM

[75] Inventor: Werner Nitschke, Ditzingen, Fed. Rep. of Germany

[73] Assignee: Robert Bosch GmbH, Stuttgart, Fed. Rep. of Germany

[21] Appl. No.: 497,505

[22] Filed: May 24, 1983

[30] Foreign Application Priority Data

Jul. 6, 1982 [DE] Fed. Rep. of Germany ....... 3225157

[51] Int. Cl.³ ............................................ H02K 33/00
[52] U.S. Cl. .................................. 318/122; 318/128; 318/132; 323/315
[58] Field of Search ............... 318/114–134; 323/315

[56] References Cited

U.S. PATENT DOCUMENTS

| | | | |
|---|---|---|---|
| 3,568,017 | 3/1971 | Schaad | 318/132 X |
| 3,649,893 | 3/1972 | Lajoie | 318/132 X |
| 3,763,745 | 10/1973 | Andersen | |
| 4,303,869 | 12/1981 | Baran | 318/130 |
| 4,338,646 | 7/1982 | Davis et al. | 323/315 X |
| 4,350,904 | 9/1982 | Cordell | 323/315 X |
| 4,435,678 | 3/1984 | Joseph et al. | 323/315 X |

Primary Examiner—Donovan F. Duggan
Attorney, Agent, or Firm—Frishauf, Holtz, Goodman & Woodward

[57] ABSTRACT

To obtain high accuracy of the control current in spite of tolerances of operation of the positioned element, a current mirror circuit (18) is provided having two current paths (17, 23). A low resistance resistor (11) is connected in series with the positioned element and the first current path (17) of the current mirror circuit. A command element (22) is connected in the second current path (23) of the current mirror circuit and connected to a command value—actual value comparator (24, 26). Thus, high accuracy of operation and control current is obtained in spite of wide tolerances of the positioning element. Losses in the system are minimized by using pulse width—modulated control thereof.

18 Claims, 1 Drawing Figure

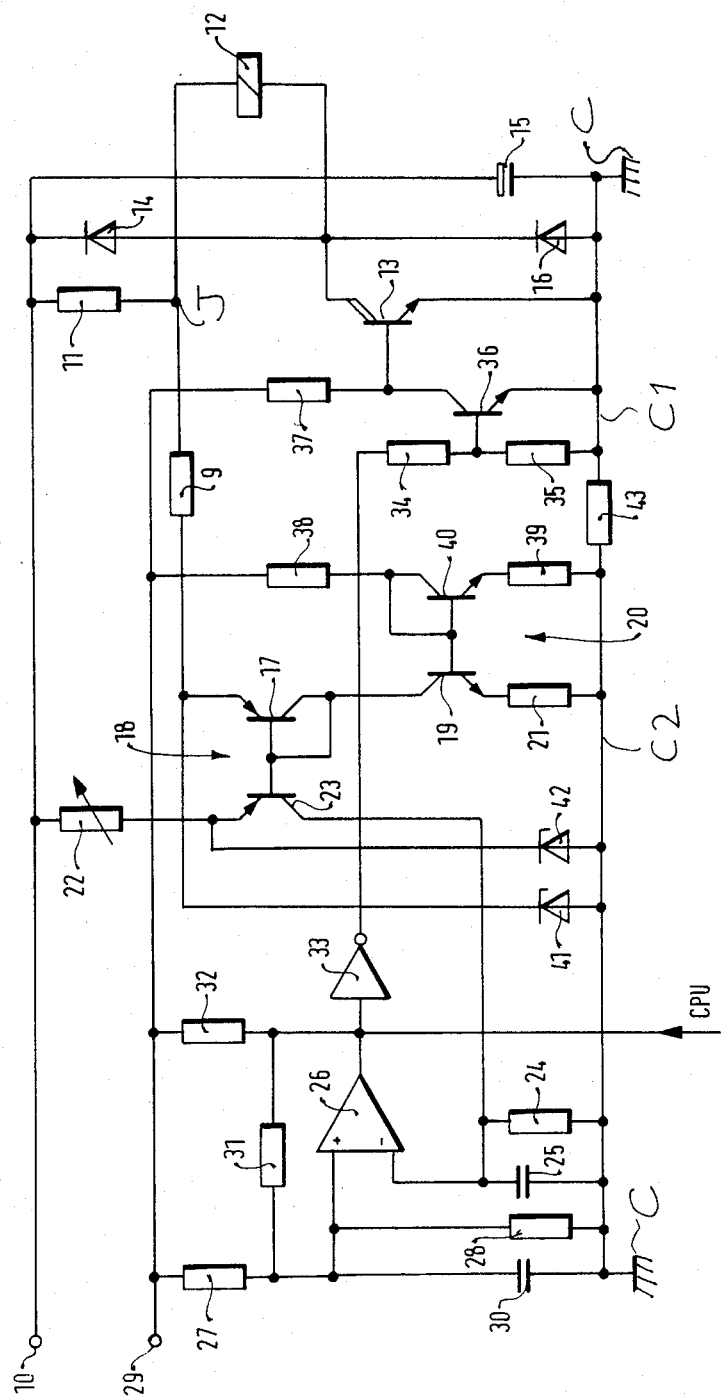

POSITIONING CONTROL SYSTEM

The invention relates to a control system for an electrical positioning element, and more particularly to a control system in which an element is positioned in dependence on current flow through a coil. The positioned element, then, may be the shaft of motor, a plunger entering into the solenoid coil, or any other structure.

BACKGROUND

Control systems for positioning elements have previously been proposed, see for example the referenced U.S. Pat. No. 3,763,745, and German Patent Disclosure Documents DE-OS Nos. 31 40 301 and 32 00 457. Control system of this type suffer from the basic problem that, if the positioning element is subject to manufacturing tolerances, it is difficult to properly control the accuracy of the value of the control current. The controlled element should, preferably, operate with low losses. While it is possible to overcome the aforementioned defects, it was heretofore necessary to use control circuits which required expensive and complex circuitry or circuit elements.

THE INVENTION

It is an object to provide a control system in which the control current has high accuracy in spite of tolerances of the positioned element, and which controls a system having low operating losses, while requiring only few components and those of simple, readily available, inexpensive construction.

Briefly, a current mirror circuit is provided having two current paths connected such that current flow through on path will be reflected in current flow in the other. A current measuring element, for example, and preferably simply a resistor, is connected serially with the positioned element and to one branch of the current mirror circuit path; a command element, for example a potentiometer, is provided to furnish a command value in form of an electrical current or voltage. A comparator is connected to the command element and through the other one of the current mirror circuit paths. The positioned element is energized in the form of pulses which are pulse-width modulated, so that the losses in the positioning element are a minimum.

The system has the advantage that high accuracy of current flow to the positioning element is obtained in spite of wide tolerances of the positioned element. Control is effected under low-loss conditions, while the system itself requires only few constructional elements.

The control system can be controlled ON/OFF directly by an NMOS signal supply system which, for example, may be delivered from a suitable computer or other control source, as well known.

In accordance with a particularly desirable embodiment of the invention, the current measuring element is a low-ohm resistor serially connected with the positioning element. The positioning element as well as the resistor are connected in a closed circuit with a free-wheeling or floating diode in parallel thereto. This is particularly desirable if the positioning element is an inductive coil. The upper as well as the lower switching threshold to obtain pulsed current can be accurately controlled by this arrangement.

The circuit can be constructed particularly simply if a comparator is used as an actual value - command value comparator and as a pulse generator for the control current. The command elements then can be constructed simply as resistors, connected with a further resistor in a voltage divider circuit, the tap point of which forms a second input to the comparator which forms the actual - command value comparison element. The voltage divider receives a current from the current mirror circuit as the actual value signal.

DRAWING

The single FIGURE illustrates a circuit diagram, partly schematic, of the positioning system.

DETAILED DESCRIPTION

The positive terminal of a supply source 10, the negative terminal of which is grounded or connected to a chassis terminal C, is connected over the series circuit of a low-ohm resistor 11—for example of about 0.15 ohms—to an electrical positioning element which, for example, is an electrical inductive element, such as a coil, a component of a dynamo electric machine, or the like. The positioning element is serially connected with the main current switching path of a power transistor 13 which, in turn, is connected to ground or chassis C. A free-wheeling diode 14 is connected in parallel to the positioned element 12 and the measuring resistor 11. A smoothing capacitor 15 is connected across the terminals 10—chassis or ground—of the power circuit. A protective diode 16 is connected across the main current carrying path of the transistor 13.

The junction J between the positioning element 12 and the measuring resistor 11 is connected to a first current path 17 of a first current mirror circuit 18. A coupling resistor 9 is interposed between the junction J and path 17. The first current path 17 of the current mirror circuit 18 is further serially connected to the first current path 19 of a second current mirror circuit 20 which, in turn, is connected through a resistor 21 to chassis or ground.

Current mirror circuits, per se, are known, and, as customarily understood, include two semiconductor elements which are so interconnected that the current through one semiconductor element will cause a corresponding or proportional current through the other semiconductor element. Each one of the semiconductor elements forms a respective current path. If two transistors are used for the current mirror circuit, then the two main switching paths of the transistors form the current paths of the current mirror circuits. The base of one transistor is connected with the base of the other, and this base connection is further connected to the collector of the transistor, of which the collector-emitter current should be mirrored in the other. The two current mirror circuits 18, 20, in an operative embodiment and in the preferred structure, use transistors which form the respective current paths, as illustrated in the Figure.

The positive supply terminal 10 is further connected through a controllable resistor 22, which forms a command value control element, to the second current mirror path 23 of the first current mirror circuit 18, and then through a resistor 24 to ground or chassis. A smoothing capacitor 25 is connected in parallel with resistor 24. The junction between the resistor 24 and the current path 23, in this case the collector of the transistor 23, is connected to the inverting input of a comparator 26 which, in its simplest form, is an operational amplifier. The direct input of the comparator 26 is connected to the tap point of a voltage divider formed by two resistors 27, 28, which are connected between ground or chassis and a terminal 29 which carries a stabilized supply voltage. A capacitor 30 is connected in parallel to resistor 28 to prevent interference with the stabilized voltage. A resistor 31, connected between the output of comparator 26 and the direct input thereof, forms a positive feedback circuit for the comparator 26. In a preferred form, the comparator 26 includes an operational amplifier which has transistors therein, the output of which is connected in an open collector circuit. The output of the comparator 26, thus, is connected over a resistor 32 with the terminal 29 carrying the stabilized supply voltage.

A control stage which, for example, may be a central processing unit (CPU) of a microcomputer, is connected to the output of the comparator 26. The output of comparator 26 is, further, connected through an inverter 33 to a voltage divider formed by resistors 34, 35, the junction of tap point of which is connected to the base of a driver transistor 36. The emitter of transistor 36 is connected to ground or chassis, and its collector is connected to the base of the output transistor 13 and, through a resistor 37, to the stabilized supply voltage 29.

A voltage divider formed by resistor 38, 39 and the second path 40 of the second current mirror circuit 20 is connected across the stabilized supply voltage 29 and ground or chassis.

The emitters of the transistors forming first and second current carrying paths 17, 23 of the first current mirror circuit are, additionally, connected to ground or chassis through Zener diodes 41, 42.

A separating resistor 43 is connected between the ground or chassis terminals C2 of the control portion of the system and the terminal C of the power output portion of the system in order to decrease the influence of high voltage changes in the power or output portion. Thus, the power or output portion containing elements 13 to 16 and 34 to 37, and the control portion having the elements 17 to 33 and 38 to 40 are connected by the separating or coupling resistor 43.

Operation: Let it be assumed that the output transistor 13 is conductive. Current will flow through the resistor 11 and the inductive positioning element 12, as well as through the emitter-collector path or power path of the transistor 13. Due to the inductivity of the positioning element 12, the current will rise continuously. Consequently, a rising voltage drop will be sensed across the sensing resistor 11 and, in dependence on this voltage drop, current will flow from resistor 11 over resistor 9 to the two current paths 17, 19 of the current mirror circuits 18, 20. This current, hence, is proportional to the current through the positioning element 12 and, thus, represents an actual current value. Due to the current mirroring effect in the current mirror circuit 18, a corresponding current will flow through the series circuit formed by the second current mirror path, including the elements 22, 23, 24. The voltage at the inverting input of the comparator 26 thus is directly proportional to the current which flows through the resistor 11, and, hence, through the positioning element 12, respectively; and, additionally, proportional to the actual current flowing through the positioning element 12.

The direct input of the comparator has a fixed voltage applied thereto which is predetermined by the voltage division ratio or the voltage divider 27, 28. Resistor 31 determines the switching hysteresis due to its connection in the feedback circuit.

The output transistor 36 is blocked or turned to nonconductive condition when the current through the positioning element 12 rises to the level at which the upper switching threshold of the comparator has been obtained, by control connection via the inverter 33 and the driver transistor 36. The current then drops gradually and continuously due to current flow in the parallel free-wheeling circuit formed by the element 12, resistor 11 and diode 14. Since the resistor 11 is included in this free-wheeling circuit, current drop is signalled to the current mirroring circuit 18 to the inverting input of the comparator 26. When the lower switching threshold is reached, comparator 26 will change state and command the transistor 13 to conduction, that is, to turn the current flow through the positioning element ON.

Control of a command value is effected by changing the value of the resistor 22.

Control will occur only if a 1-signal is applied from the CPU to the output of the comparator 26. A 1-signal may, for example, be represented by a voltage level of 5 V. Since the output of the comparator 26 is an open-collector output, the 1-signal can be dropped to a 0-signal in dependence on the switching state of the comparator 26. If, however, the CPU provides a 0-signal to the output of the comparator 26, no further pulses can be generated, and the control system is thus then disabled. The CPU, thus, provides in effect only an ON or OFF signal to the circuit to, respectively, place it operation or turn it off.

Of course, the circuit is equally applicable to receive ON/OFF control commands with inverse voltage. Under such conditions, the inverter 33 can omitted. In principle, of course, inversion of the switching signal can be obtained by eliminating the driver transistor 36 with correspondingly lower current through the positioning element 12. The inverter 33 may, of course, also be formed as an inverting stage, that is, a pre-driver transistor or the like, if more amplification is needed.

The second current mirror circuit 20 has a constant current flowing through the current mirror path 40 due to its connection in the voltage divider 38, 39 which, in turn, is connected to the stabilized voltage supply derived from terminal 29. It is used to increase the current accuracy upon variations of the supply voltage at terminal 10. Current variations in the current mirror path 17 are suppressed due to the current mirroring effect of the second current mirror circuit 20.

The system may be installed in automotive equipment or battery supplied equipment with 12 V nominal battery supply voltage on terminal 10. In automotive applications, voltage peaks may be superimposed on the nominal voltage. Such voltage peaks, for example due to switching effects in external networks may have instantaneous peak value of up to 100 V. It is thus necessary to protect the current mirror circuit against such stray voltage peaks. Protection is obtained by the two Zener diodes 41, 42 which are designed to short-circuit any voltage peaks above 35 V. Current through the low-ohm resistor 11 may be very high. A Zener diode 41 would thus be required which can carry substantial current. Such Zener diodes are expensive. In order to permit use of cheaper Zener diodes, current limiting resistor 9 is connected in the circuit coupled to junction J in order to provide current limiting. Zener diode 42 need not be connected to a separate current limiting resistor since current limiting is obtained already through the resistor 22.

The circuit can be constructed inexpensively. The five transistors 17, 23; 19, 40; 36 can be part of an integrated transistor circuit CA 3096 which is a single five-transistor unit.

Smoothing capacitor 15 and the associated protective diode 16 are not strictly required, but desirable. In a simpler version, they may be omitted. They are used to protect the circuit and suppress voltage peaks which may arise between terminal 10 and ground or chassis.

The resistor 22, providing a controlled current to the second current mirror path, determines the proportionality of the current mirror effect to the first current mirror circuit.

Various changes and modifications may be made within the scope of the inventive concept.

I claim:

1. Positioning control system providing interrupted, plused current to a positioning element (12) having
   an output controlled semiconductor switch (13) connected to control current flow through the positioning element;
   a network connected to the control electrode of the controlled semiconductor switch to render said semiconductor switch alternately conductive and non-conductive in accordance with a commanded duty cycle;
   and current measuring means (11) serially connected with the positioning element (12),
   said network including, in accordance with the invention,
   a current mirror circuit (18) having two current paths (17, 23) connected such that current flow through one path (17) will be reflected in current flow through the other (23),
   said current measuring means (11) being connected to one (17) of said current mirror circuit paths;
   a command element (22) providing a command value in form of an electrical current;
   and a comparator (24, 25; 26; 27-32), said comparator being connected to the command element (22) through the other (23) of said current mirror paths.

2. Circuit according to claim 1, wherein said current measuring means (11) comprises a resistor.

3. Circuit according to claim 1, wherein said output controlled semiconductor switch (12) comprises an output transistor (12);
   and said current measuring means comprises a low-ohm resistor serially connected with the main current carrying path of said transistor (13).

4. Circuit according to claim 3, further including a free-wheeling diode (14) connected across the positioning element (12) and the resistor (11) to form a closed circuit loop therewith.

5. Circuit according to claim 1, further including a source (29, 27, 28, 30) of reference voltage;
   said source of reference voltage being connected to the comparator (26) as a reference input, and means (24) applying a voltage representative of current flow through the other (23) of said current mirror circuit paths to said comparator (26);
   and circuit means (31) providing pulsed output signals from said comparator in dependence on the relative values of the voltage supplied by said circuit means to a comparison input (inverting) of the comparator in relation to the voltage applied by said reference source to a reference input (direct) of the comparator.

6. Circuit according to claim 5, wherein the command element (22) comprises a resistor, and said circuit means comprises a further resistor, serially connected with said command resistor (22) to form a voltage divider therewith, the comparison input of the comparator (26) being connected to an interconnection point between the resistors (22, 24) of said voltage divider.

7. Circuit according to claim 1, wherein said comparator (26) comprises an open collector output circuit;
   and circuit means (CPU) selectively applying voltage signals of different levels to the output circuit of the comparator to, respectively, permit the comparator to provide output current pulses to the controlled semiconductor switch (13) or, respectively, to clamp the output from said comparator to a fixed voltage level commanding interruption of current flow through said controlled semiconductor switch (13).

8. Circuit according to claim 7, wherein the source of ON/OFF control voltage comprises a microprocessor supplying, alternatively, 1-signals and 0-signals to control, selectively, ON/OFF state of the positioning control system.

9. Circuit according to claim 7, further including an inverter (33) serially connected between the comparator (26) and the controlled semiconductor switch (13).

10. Circuit according to claim 1, further including at least one Zener diode (41, 42) connected to at least one of the current carrying paths (17, 23) of the current mirror circuit (18) to provide over-voltage protection to the current mirror paths.

11. Circuit according to claim 9, further including a current limiting resistor (9) connected between said one (17) of the current mirror circuit paths and the current measuring means (11).

12. Circuit according to claim 1, further including a second current mirror circuit (20), said one (17) of the current mirror paths of the first current mirror circuit (18) being connected to a first current mirror path (19) of the second current mirror circuit, the second current mirror path (40) of the second current mirror circuit being connected to a constant current source (29, 38, 39).

13. Circuit according to claim 1, wherein the system includes a control portion and a power portion, the control portion including said current mirror circuit (18) and said command element (22) and said comparator;
   the power portion including said controlled semiconductor switch (13), said positioning element (12) and said current measuring means;
   wherein said control portion and said power portion are, respectively, connected to separate ground or chassis connection buses;
   and a coupling resistor (43) interconnecting said ground or chassis connection buses to prevent feedback of instantaneous voltage changes arising in the power portion upon change in current flow therein on the control portion of the system.

14. Circuit according to claim 5, further including a second circuit mirror circuit (20), said one (17) of the current mirror paths of the first current mirror circuit (18) being connected to a first current mirror path (19) of the second current mirror circuit, the second current mirror path (40) of the second current mirror circuit being connected to a constant current source (29, 38, 39).

15. Circuit according to claim 7, further including a second current mirror circuit (20), said one (17) of the current mirror paths of the first current mirror circuit (18) being connected to a first current mirror path (19) of the second current mirror circuit, the second current mirror path (40) of the second current mirror circuit being connected to a constant current source (29, 38, 39).

16. Circuit according to claim 5, further including a current limiting resistor (9) connected between said one (17) of the current mirror circuit paths and the current measuring means (11).

17. circuit according to claim 16, further including a second current mirror circuit (20), said one (17) of the current mirror paths of the first current mirror circuit (18) being connected to a first current mirror path (19) of the second current circuit, the second current mirror path (40) of the second current mirror circuit being connected to a constant current source (29, 38, 39).

18. Circuit according to claim 17, wherein the system includes a control portion and a power portion, the control portion including said current mirror circuit (18) and said command element (22) and said comparator;
- the power portion including said controlled semiconductor switch (13), said positioning element (12) and said current measuring means;
- wherein said control portion and said power portion are, respectively, connected to separate ground or chassis connection buses;
- and a coupling resistor (43) interconnecting said ground or chassis connection buses to prevent feedback of instantaneous voltage changes arising in the power portion upon change in current flow therein on the control portion of the system.

* * * * *

UNITED STATES PATENT AND TRADEMARK OFFICE
CERTIFICATE OF CORRECTION

PATENT NO. : 4,496,885

DATED : January 29, 1985

INVENTOR(S) : Werner NITSCHKE

It is certified that error appears in the above-identified patent and that said Letters Patent is hereby corrected as shown below:

Claim 17, column 7 line 19 change "second current circuit" to read -- second current mirror circuit --

Signed and Sealed this

Twenty-seventh Day of August 1985

[SEAL]

Attest:

DONALD J. QUIGG

Attesting Officer    Acting Commissioner of Patents and Trademarks